(12) United States Patent
Ko

(10) Patent No.: US 9,429,959 B2
(45) Date of Patent: Aug. 30, 2016

(54) CONTROL APPARATUS FOR A LINEAR MOTION STAGE, AND LINEAR MOTION SYSTEM

(71) Applicant: Soonhan Engineering Corp., Kyungki-Do (KR)

(72) Inventor: Byoung Gwan Ko, Seoul (KR)

(73) Assignee: Soonhan Engineering Corp., Sungnam (KR)

( * ) Notice: Subject to any disclaimer, the term of this patent is extended or adjusted under 35 U.S.C. 154(b) by 344 days.

(21) Appl. No.: 14/198,107

(22) Filed: Mar. 5, 2014

(65) Prior Publication Data
US 2014/0257570 A1   Sep. 11, 2014

(30) Foreign Application Priority Data

Mar. 7, 2013   (KR) .................. 10-2013-0024619

(51) Int. Cl.
| | | |
|---|---|---|
| G05D 23/00 | (2006.01) | |
| G05D 19/02 | (2006.01) | |
| G05B 19/404 | (2006.01) | |

(52) U.S. Cl.
CPC ............. *G05D 19/02* (2013.01); *G05B 19/404* (2013.01); *G05B 2219/49176* (2013.01)

(58) Field of Classification Search
None
See application file for complete search history.

(56) References Cited

U.S. PATENT DOCUMENTS

| | | | | |
|---|---|---|---|---|
| 6,956,505 B2 * | 10/2005 | Taniguchi | ........... | H03M 1/1038 341/11 |
| 7,262,714 B2 * | 8/2007 | Foo | .................. | G01D 5/34792 341/13 |
| 7,817,747 B2 * | 10/2010 | Waheed | .................. | H03C 5/00 375/298 |
| 8,324,848 B2 * | 12/2012 | Widdowson | ......... | G05B 19/404 318/135 |
| 8,384,570 B2 * | 2/2013 | Hunter | ............... | G01D 5/24419 341/1 |
| 9,269,365 B2 * | 2/2016 | Su | .......................... | G10L 19/09 |
| 2005/0243042 A1 * | 11/2005 | Shivji | .................... | G09G 3/002 345/82 |
| 2006/0136157 A1 | 6/2006 | Sun et al. | | |

(Continued)

FOREIGN PATENT DOCUMENTS

| | | |
|---|---|---|
| JP | 2000330642 A | 11/2000 |
| JP | 2005071034 A | 3/2005 |

(Continued)

OTHER PUBLICATIONS

Wang at el. "Quality Enhancement of Coded Transient Audio with a Post-filter in Frequency Domain", 2010 IEEE, pp. 506-509.*

(Continued)

*Primary Examiner* — Van Nguyen
(74) *Attorney, Agent, or Firm* — Kenyon & Kenyon LLP

(57) ABSTRACT

A control apparatus for a linear motion stage includes: a first filter for filtering the frequency of a signal received from a linear encoder of the linear motion stage; an adder for adding an input signal representing a command position and a negative of an output signal of the first filter; a control for generating a control signal for controlling the linear motion stage based on an output signal of the adder; and a second filter for filtering the frequency of the control signal. Each of the input terminals of the first and second filters has a correction table for storing cut-off frequencies and damping rates measured according to the driven positions of the linear motion stage, thereby applying the correction table so as to determine the cut-off frequencies of the first and second filters and the damping rates according to the driven positions of the linear motion stage.

4 Claims, 5 Drawing Sheets

(56) References Cited

U.S. PATENT DOCUMENTS

2007/0189417 A1* 8/2007 Waheed .................. H03C 5/00
375/300
2010/0303460 A1* 12/2010 Hunter ............... G01D 5/24495
398/25

FOREIGN PATENT DOCUMENTS

| KR | 20010075266 A | 8/2001 |
| KR | 20040054906 A | 6/2004 |

OTHER PUBLICATIONS

Slonim "The Use of Simple FIR Filters for Filtering of ECG Signals and a New Method for Post-Filter Signal Reconstruction", 1993 IEEE, pp. 871-873.*

Y. Zhao, et al., "Compensation algorithms for sliding mode observers in sensorless control of IPMSMs", Electric Vehicle Conference, 2012 IEEE International, p. 1-7, Mar. 4, 2012.

European Search Report, dated Jul. 3, 2014, issued in corresponding European Patent Application No. 2014000700.

* cited by examiner

CONTROL APPARATUS FOR A LINEAR MOTION STAGE, AND LINEAR MOTION SYSTEM

CROSS-REFERENCE TO RELATED APPLICATIONS

The present application claims priority to Application No. 10-2013-0024619, filed in the Republic of Korea on Mar. 7, 2013, which is expressly incorporated herein in its entirety by reference thereto.

FIELD OF THE INVENTION

The present invention relates to a control apparatus for a linear motion stage, and to a linear motion system. For example, the present invention relates to a control apparatus for a linear motion stage for eliminating an inherent oscillation frequency of a linear motion stage varying with its driven position by mapping cut-off frequencies of a filter and damping rates to the driven positions of the linear motion stage.

BACKGROUND INFORMATION

When controlling a linear motion stage, oscillatory motions inherently occur, resulting in unstable operations and undesirable oscillation responses.

Therefore, an analysis of the frequency response generally is performed to determine the type, frequency, and amplitude of the oscillation, according to which a suitable filter is designed in order to eliminate the inherent oscillatory motions of the linear motion stage, thus stabilizing it and improving the capability of the controlling response. The filter generally is designed to have a single cut-off frequency regardless of the positions of the linear motion stage.

However, the inherent oscillation of the linear motion stage varies with the driven positions of the linear motion stage according to the type and structure of the linear motion stage. For example, the inherent oscillation frequency of the linear motion stage varies with the position of the slide according to working/assembling/frictional characteristics for a single axial stage, and additionally with the position of the slide along both axes for an X-Y stage.

FIGS. 1(a) and 1(b) illustrate an example of the resonance frequency varying with the position of a linear motion stage. FIG. 1(a) illustrates the frequency response of the Y-axis at X and Y coordinates (0 mm, 0 mm) in a stacked X-Y stage, and FIG. 1(b) illustrates the frequency response of the Y-axis at X and Y coordinates (225 mm, 300 mm) in a stacked X-Y stage.

In case the degree of the linear motion stage's assembling or working deviates greatly according to its driven positions, or in case of a linear motion stage with two or more axes connected to each other, the inherent oscillation frequency and amplitude vary with the driven position of the stage, as shown in FIGS. 1 (a) and 1(b). Thus, in conventional system employing a filter having a single representative cut-off frequency, the filter cannot properly perform its function over the whole operational range of the linear motion stage, and accordingly in some cases there occurs an unstable frequency amplified to make the linear motion system unstable, for which the filter cannot be applied.

FIGS. 2(a) and 2(b) illustrate an example of controlling response by a resonance frequency varying with the position of the linear motion stage. FIG. 2(a) illustrates the control response of the Y-axis at X and Y coordinates (0 mm, 0 mm) in a stacked X-Y stage, and FIG. 2(b) illustrates the control response of the Y-axis at X and Y coordinates (225 mm, 300 mm) in a stacked X-Y stage.

In case the inherent oscillation frequency and amplitude vary with the driven position of the stage, as illustrated in FIGS. 1(a) and 1(b), a filter with a fixed cut-off frequency and fixed amplitude cannot properly perform its filtering function over the whole operational range of the stage, resulting in the control response mixed with oscillation components, as illustrated in FIGS. 2(a) and 2(b).

SUMMARY

Example embodiments of the present invention provide for changing the cut-off frequency and damping rate so as to attenuate the inherent oscillation frequency varying with the driven position of a linear motion stage.

Example embodiments of the present invention provide a control apparatus of a linear motion stage. The linear motion stage includes a first filter for filtering the frequency of a signal received from a linear encoder of the linear motion stage, an adder for adding an input signal representing a command position and a negative of an output signal of the first filter, a control device for generating a control signal for controlling the linear motion stage based on an output signal of the adder, and a second filter for filtering the frequency of the control signal. Each of the input terminals of the first filter and the second filter has a correction table for storing cut-off frequencies and damping rates measured according to the driven positions of the linear motion stage, thereby applying the correction table so as to determine the cut-off frequencies of the first and second filters and the damping rates according to the driven positions of the linear motion stage.

Example embodiments of the present invention provide a linear motion system having a linear motion stage, which includes a linear motor and a linear encoder. The linear motion system further includes a control apparatus, such as that described above, for the linear motion stage.

If the linear motion stage is placed between two adjacent ones of the driven positions, the cut-off frequency of each of the first and second filters and the damping rate are obtained by interpolating between the cut-off frequency and damping rate of one of the adjacent driven positions and those of the other of the adjacent driven positions, the interpolating method being one of the linear interpolation, Lagrange's polynomial interpolation, Neville's recursive method, Newton's polynomial interpolation, spline interpolation, etc.

According to example embodiments of the present invention, the inherent oscillation frequency of a linear motion stage varying with its driven position may be eliminated by mapping cut-off frequencies of a filter and damping rates to the driven positions of the linear motion stage, resulting in, for example, the following advantages:

First, uniform stable frequency response characteristics may be provided regardless of the driven positions of the linear motion stage.

Second, uniform control response may be provided regardless of the driven positions of the linear motion stage.

Third, improved control response may be provided through elimination of unstable frequency components of the linear motion stage.

Fourth, the configuration of the structure of the linear motion stage is considered to be more simplified and more convenient.

Further features and aspects of example embodiments of the present invention are explained in more detail below with reference to the appended Figures.

DETAILED DESCRIPTION

Figure 1A:
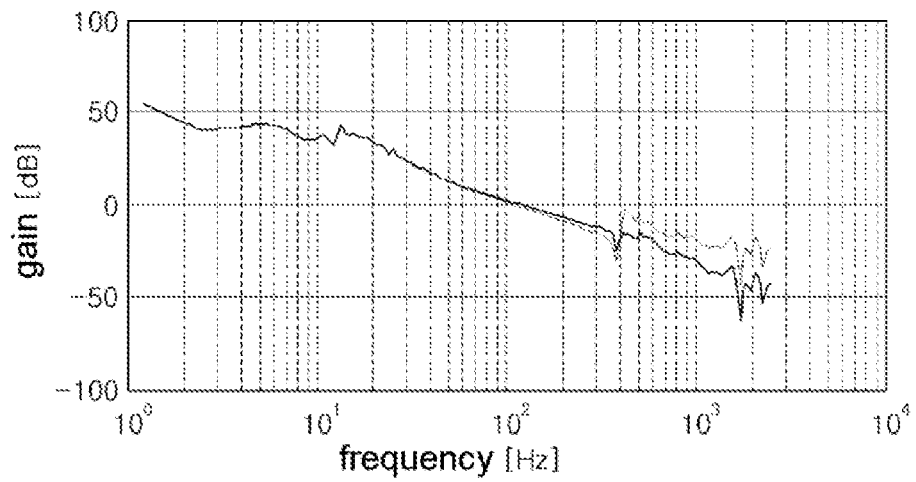
FIGS. 1(a) and 1(b) illustrate an example of the resonance frequency varying with the position of a linear motion stage.
Figure 1B:
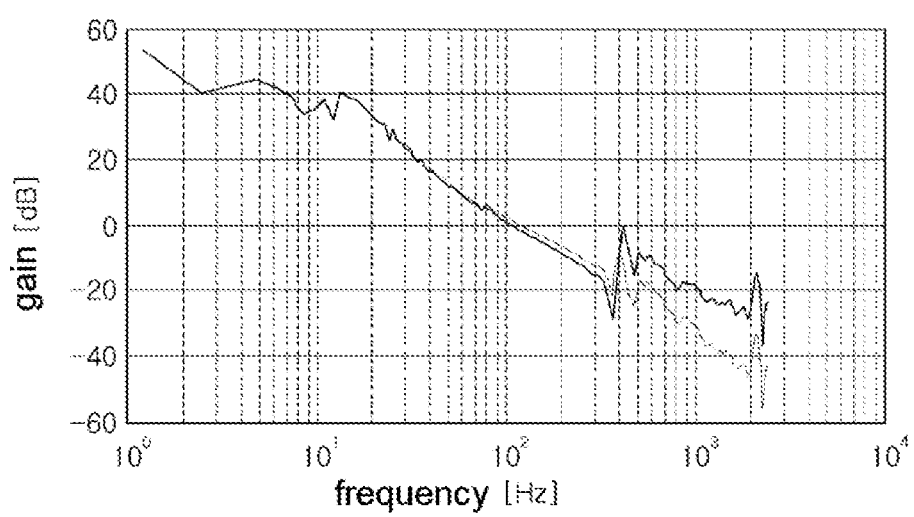
Figure 2A:
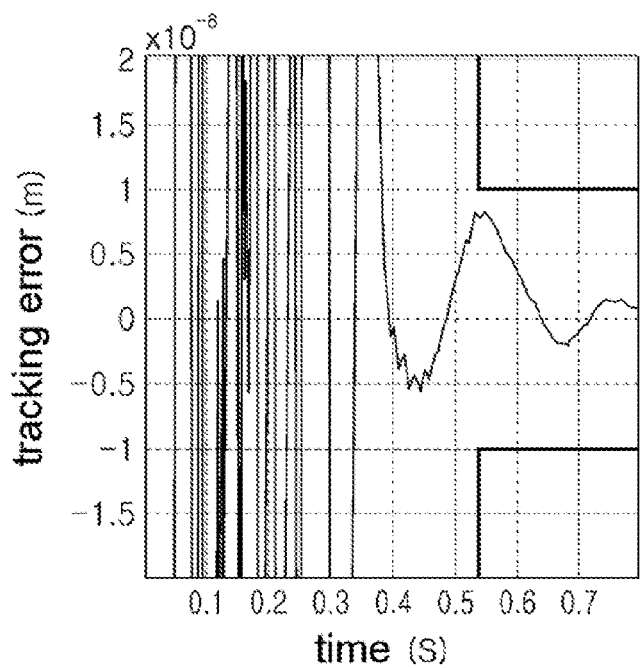
FIGS. 2(a) and 2(b) illustrate an example of controlling response by a resonance frequency varying with the position of the linear motion stage.
Figure 2B:
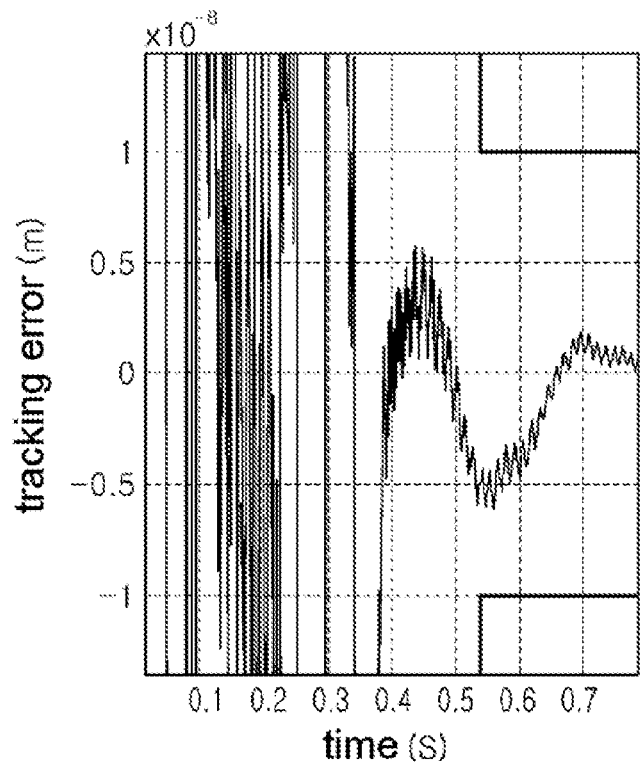

Example embodiments of the present invention are described in more detail with reference to the appended Figures. Components having the same or similar functions are represented by same reference numerals throughout the attached Figures. It should be understood that components described as being connected with another means directly connected with each other and also indirectly connected with each other through an intermediate other component between them.

Before describing a control apparatus of a linear motion stage according to example embodiments of the present invention, a conventional linear motion stage is first described.

A linear motion stage is generally employed to transfer an article along a straight line in various industries such as the semiconductor (wafer) industry, the flat display (e.g. LCD, OLED, etc.) industry, and the machine tool industry.

The types of the linear motion stage include a single axial stage, X-Y stage such as stacked XY stage, split XY stage and Gantry stage, and a type of a single axial or X-Y stage associated with an additional stage for rotational or vertical (Z) movement.

Figure 3:
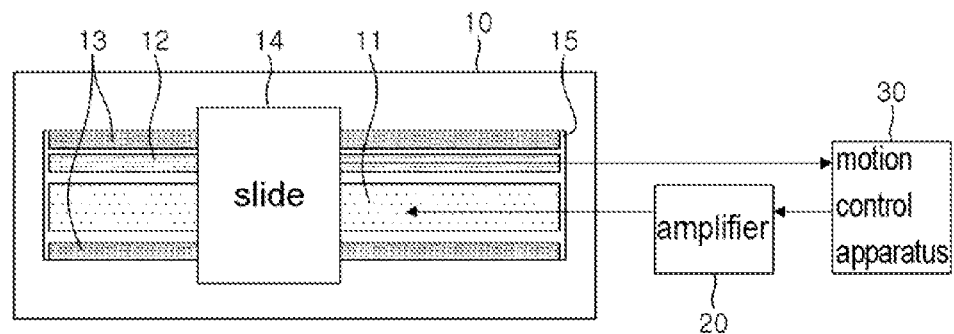
FIG. 3 is a block diagram that illustrates a conventional linear motion system.

FIG. 3 is a block diagram that illustrates the structure of a conventional linear motion system.

Referring to FIG. 3, the linear motion stage generally includes a linear motion stage 10, an amplifier 20, and a motion control apparatus 30.

The linear motion stage 10 further includes a linear motor 11, a linear encoder 12, a linear motion guide 13, a slide 14, and a base 15.

The linear motor or actuator 11 serves to produce a linear thrust for transferring an article along a straight line.

The linear encoder 12 provided on one side of the linear motor 11 includes a sensor to detect the position of the slide 14 driven by the linear motor 11, i.e., the linearly moving distance of the slide.

The linear motion guides 13 provided in both sides of the linear motor 11 are provided to guide the slide 14 driven by the linear motor 11 along a straight line.

The slide 14 mounted on the top of the linear motor 11 is driven by a thrust generated by the linear motor 11, thus moving along the guide surfaces of the linear motion guides 13.

The base 15 is provided to support the structure of the linear motion stage 10, e.g., under the linear motor 11, linear encoder 12, linear motion guide 13, and slide 14.

The amplifier 20 amplifies the output signal of the motion control apparatus 30, e.g., the drive signal for driving the linear motor 11 of the linear motion stage 10, the drive signal being applied to the linear motor 11.

The motion control apparatus 30 receives a feedback signal representing the position of the slide 14 from the linear encoder 12 of the linear motion stage 10, and generates a control signal for driving the linear motor 11 to move the slide 14 to a desired position.

In the linear motion system structured as described above, the motion control apparatus 30 may employ a mapping in order to control the linear motion stage 10.

Here, the process of mapping includes detecting positioning precision errors relating to the driven positions of the linear motion stage, storing the data of the errors in the form of a correction table, and driving the linear motion stage to a correct position by using the correction table when actually operating the linear motion stage. This is referred to as the positioning precision correction.

More specifically, the positioning precision errors are detected based on a given interval, prepared as an error table, which serves as a reference for controlling the linear motion stage to be moved to a correct position by adding or reducing the corresponding error value to or from the position of the linear motion stage primarily detected. If the stage is placed in the interval between two adjacent positions at which the positioning precision errors are detected, the two adjacent error values are subjected to linear interpolation to determine the position of the stage, thereby adjusting the stage drive command by the error thus obtained.

Example embodiments of the present invention employ a positioning precision correction to preliminarily detect the cut-off frequencies of the filter and damping rates according to the driven positions of the linear motion stage when designing the filter, the cut-off frequencies and damping rates being stored in the form of a correction table. Thus, when actually operating the linear motion stage, the correction table is used to change the cut-off frequency of the filter and the damping rate according to the position of the stage. In other words, the position of the linear motion stage is corrected in view of its control stability and control response capability.

Figure 4:
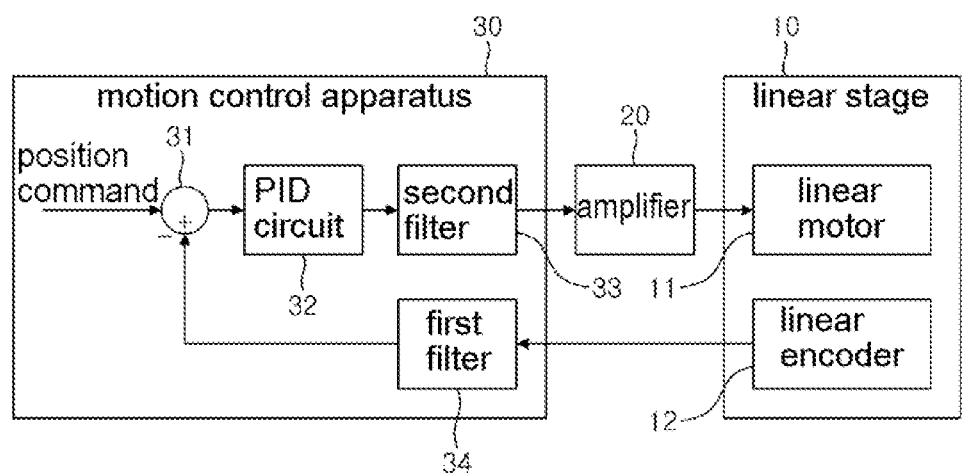
FIG. 4 is a block diagram that illustrates the structure of a control apparatus of a linear motion stage according an example embodiment of the present invention.

FIG. 4 is a block diagram that illustrates the structure of a control apparatus of a linear motion stage according an example embodiment of the present invention.

Referring to FIG. 4, a control apparatus 30 of a linear motion stage according an example embodiment of the present invention includes an adder 31, a PID (Proportional-Integral-Derivative) circuit 32, a first filter 34, and a second filter 33.

Firstly, the first filter 34 and the second filter 33 are respectively provided to filter unwanted frequencies from the signal received from the linear encoder 12 of the linear motion stage 10 and from the output signal of the PID circuit 32, which may be provided as software.

In addition, the first filter 34 and the second filter 33 have, respectively, their input terminals provided with the correction tables storing the cut-off frequencies and the damping rates preliminarily detected according to the driven positions of the linear motion stage, as described above. Thus, the cut-off frequency of the filters and the damping rate may be changed by using the correction tables according to the driven positions of the linear motion stage.

The adder 31 adds the input command position and the negative of the output signal of the first filter 34, applying the output signal to the PID circuit 32.

The PID circuit 32 proportions, integrates, and derives the signal received from the adder 31, e.g., the difference between the input command position and the position of the stage, so as to generate a control signal. This is a conventional technique, and a detailed description thereof is consequently omitted. Also, the PID circuit 32 may be replaced by another control circuit, such as a PIV control, a feed-forward control, etc.

Figure 5:
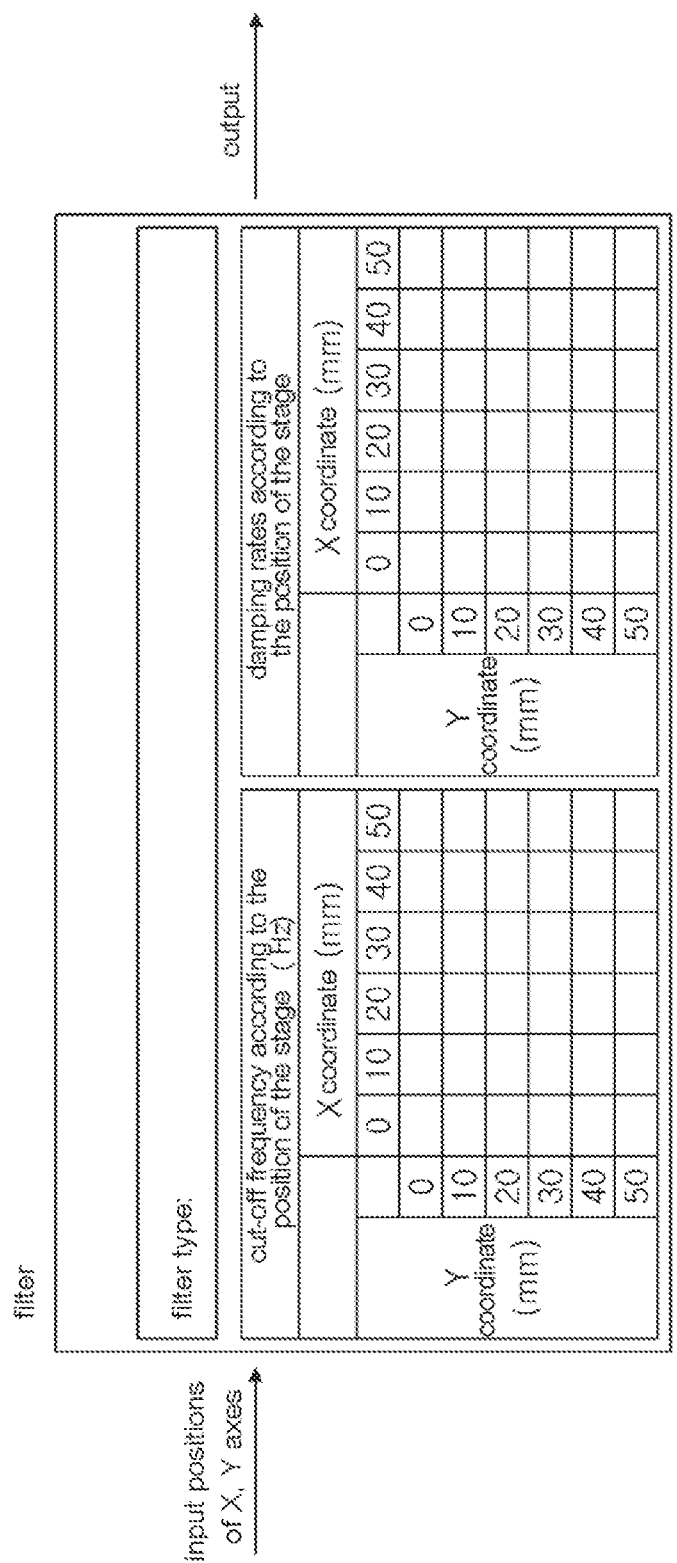
FIG. 5 is a table that illustrates mapping of the cut-off frequencies of a filter to different positions of a linear motion stage according to an example embodiment of the present invention.

FIG. 5 is a table that illustrates mapping the cut-off frequencies of a filter to different positions of a linear motion stage according to an example embodiment of the present invention.

The first and second filters provided in the control apparatus of the linear motion stage include the cut-off frequency and the damping rate. For example, in a linear motion stage having X-Y axes, the cut-off frequency of the filter and the damping rate may be defined as a function depending on the position of each of the axes of the linear motion stage, as follows:

$$F\_frequency(X)=f(Position\_x, Position\_y)$$

$$F\_damping(X)=f(Position\_x, Position\_y)$$

$$F\_frequency(Y)=f(Position\_x, Position\_y)$$

$$F\_damping(Y)=f(Position\_x, Position\_y)$$

F_frequency represents the cut-off frequency of the filter, and F_damping represents the damping rate. Also Position_x and Position_y respectively represent the driven position of the XY axes of the linear motion stage.

Based on the above relationships, the cut-off frequency of the filter and the amplitude are detected according to the driven positions of the linear motion stage, and the detected data is used to construct a correction table that includes the cut-off frequencies and the damping rates according to the driven positions of the stage, as illustrated in FIG. 5.

The correction table as illustrated in FIG. 5 is stored in a memory provided in the control apparatus of the linear motion stage, referencing the input terminals of the first and second filters.

Accordingly, the first and second filters may have the cut-off frequency and the damping rate determined according to the X and Y coordinates of the linear motion stage.

Figure 6:
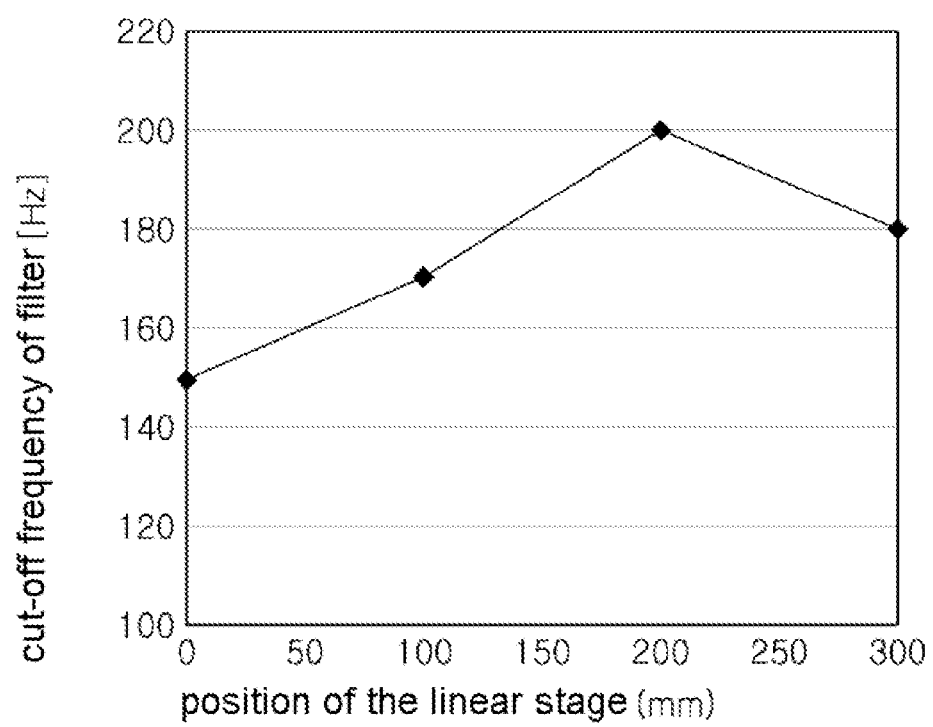
FIG. 6 is a graph that illustrates the determination of the cut-off frequency of a filter in an interval in addition to measured positions according to an example embodiment of the present invention.

FIG. 6 is a graph that illustrates the determination of the cut-off frequency of a filter in an interval in addition to measured positions according to an example embodiment of the present invention.

As illustrated in FIG. 6, in case the cut-off frequency of the filter is defined at every interval of 100 mm, the position of the linear motion stage placed between two adjacent positions defined may have the cut-off frequency of the filter obtained by linearly interpolating the two adjacent cut-off frequencies.

For example, if the linear motion stage is placed at a position of 50 mm, the cut-off frequency of the filter may be defined as 160 Hz.

If the linear motion stage is placed between two adjacent ones of the detected positions, the interpolating method for obtaining the cut-off frequency of the filter and the damping rate at that position may be selected among the linear interpolation, Lagrange's polynomial interpolation, Neville's recursive method, Newton's polynomial interpolation, spline interpolation, etc.

It should be appreciated that the foregoing description is not intended to be limiting, and that numerous modifications may be made without departing from the spirit and scope hereof.

LIST OF REFERENCE NUMERALS 10 linear motion stage
11 linear motor
12 linear encoder
13 linear motion guide
14 slide
15 base
20 amplifier
30 motion control apparatus
31 adder
32 PID circuit
33 second filter
34 first filter

What is claimed is:

1. A control apparatus for a linear motion stage, comprising:
    a first filter adapted to filter a frequency of a signal received from a linear encoder of the linear motion stage;
    an adder adapted to add an input signal representing a command position and a negative of an output signal of the first filter;
    a control unit adapted to generate a control signal to control the linear motion stage based on an output signal of the adder; and
    a second filter adapted to filter a frequency of the control signal;
    wherein input terminals of the first filter and the second filter include a correction table for storing cut-off frequencies and damping rates measured according to driven positions of the linear motion stage, the first filter and the second filter adapted to apply the correction table to determine a cut-off frequency of the first filter and the second filter and the damping rates according to the driven positions of the linear motion stage; and
    wherein if the linear motion stage is placed between two adjacent ones of the driven positions, the cut-off frequency of each of the first filter and the second filter and the damping rate are obtained by an interpolation between the cut-off frequency and damping rate of one of the adjacent driven positions and the cut-off frequency and damping rate of the other of the adjacent driven positions.

2. The control apparatus according to claim 1, wherein the interpolation includes at least one of a linear interpolation, a Lagrange's polynomial interpolation, a Neville's recursive method, a Newton's polynomial interpolation, and a spline interpolation.

3. A linear motion system comprising:
    a linear motion stage including:
        a linear motor; and
        a linear encoder; and
    a control apparatus including:
        a first filter adapted to filter a frequency of a signal received from a linear encoder of the linear motion stage;

an adder adapted to add an input signal representing a command position and a negative of an output signal of the first filter;

a control unit adapted to generate a control signal to control the linear motion stage based on an output signal of the adder; and a second filter adapted to filter a frequency of the control signal;

wherein input terminals of the first filter and the second filter include a correction table for storing cut-off frequencies and damping rates measured according to driven positions of the linear motion stage, the first filter and the second filter adapted to apply the correction table to determine a cut-off frequency of the first filter and the second filter and the damping rates according to the driven positions of the linear motion stage; and wherein if the linear motion stage is placed between two adjacent ones of the driven positions, the cut-off frequency of each of the first filter and the second filter and the damping rate are obtained by an interpolation between the cut-off frequency and damping rate of one of the adjacent driven positions and the cut-off frequency and damping rate of the other of the adjacent driven positions.

4. The linear motion system according to claim 3, wherein the interpolation includes at least one of a linear interpolation, a Lagrange's polynomial interpolation, a Neville's recursive method, a Newton's polynomial interpolation, and a spline interpolation.

\* \* \* \* \*